US008108681B2

(12) United States Patent
Venkiteswaran

(10) Patent No.: US 8,108,681 B2
(45) Date of Patent: Jan. 31, 2012

(54) SELECTING BIT POSITIONS FOR STORING A DIGITAL WATERMARK

(75) Inventor: Sreekrishnan Venkiteswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/949,400

(22) Filed: Dec. 3, 2007

(65) Prior Publication Data

US 2009/0141929 A1 Jun. 4, 2009

(51) Int. Cl.
*H04L 9/32* (2006.01)

(52) U.S. Cl. ........................................ 713/176; 382/100

(58) Field of Classification Search .................. 713/176; 382/232, 100; 375/240.11; 380/200, 201, 380/203; 726/26
See application file for complete search history.

(56) References Cited

U.S. PATENT DOCUMENTS 6,061,793 A 5/2000 Tewfik et al.
6,272,176 B1 8/2001 Srinivasan
6,408,082 B1 6/2002 Rhoads et al.
6,661,842 B1 * 12/2003 Abousleman ............ 375/240.11
6,674,876 B1 1/2004 Hannigan et al.
7,043,019 B2 5/2006 Tehranchi et al.
2002/0138730 A1 9/2002 Kim
2003/0172277 A1 9/2003 Suzuki et al.
2006/0153422 A1 * 7/2006 Tapson et al. ................. 382/100
2006/0213999 A1 * 9/2006 Wang et al. .............. 235/462.25
2006/0239503 A1 * 10/2006 Petrovic et al. ............... 382/100

OTHER PUBLICATIONS

"A Digital Audio Watermarking Using Two Masking Effects", Yong Hun Kim, Hwan II Kang, Kab II Kim, and Seung-Soo Han, NPT Center, Myongji University, Division of Electrical and Information Control Engineering, PCM 2002, LNCS 2532, pp. 655-662, Springer-Verlag Berlin Heidelberg 2002.
"Channel Capacity of High Bit Rate Audio Data Hiding Algorithms in Diverse Transform Domains", Cvejic, N.; Seppanen, T. Communications and Information Technology, 2004, ISCIT 2004, IEEE International Symposium on vol. 1, Issue, Oct. 26-29, 2004 pp. 84-88 vol. 1.
Koukopouls, et al., "A Compressed-Domain Watermarking Algorithm for Mpeg Audio Layer 3" published in MM&Sec '01 Proceedings of the 2001 workshop on Multimedia and Security: New Challenges.
Koukopoulos, et al., "An Efficient Watermarking Method for MP3 Audio Files", World Academy of Science, Engineering and Technology 2005.
Kirovski, et al., "Spread-Spectrum Watermarking of Audio Signals", IEEE Transactions on Signal Processing Special Issue on Data Hiding, manuscript received Dec. 1, 2002; revised Dec. 2, 2002.
Kirovski, et al., "Robust Covert Communication over a Public Audio, Channel Using Spread Spectrum", Microsoft Research, research.microsoft.com/users/darkok/papers/26_Kirovski.pdf.
"An Audio Watermarking Technique That is Robust Against Random Cropping dio Watermarking in the Time Domain", 58 Computer Music Journal Wei Li and Xiangyang Xue Department of Computer Science and Engineering University of Fudan Shanghai, China 200433, Computer Music Journal, 27:4, pp. 58-68, Winter 2003.

(Continued)

*Primary Examiner* — Kimyen Vu
*Assistant Examiner* — Suman Debnath
(74) *Attorney, Agent, or Firm* — Eric W B. Dias; Roy W. Truelson

(57) ABSTRACT

A method comprises selecting bit positions for storing a digital watermark in digital audio data in time domain by choosing a spread function characterising the plurality of the selected bit positions, wherein the spread function comprises at least one Gaussian curve.

13 Claims, 4 Drawing Sheets

OTHER PUBLICATIONS

"Increasing Robustness of an Improved Spread Spectrum Audion Watermarking Method Using Attack Characterization", Nedeljko Cvejic and Tapio Seppanen, Media Tam Oulu Group, Information Processing Laboratory, Universiy of Oulu Finland, www.mediateam.oulu.fi/publications/pdf/464.pdf.

In-Kwon, et al, "Modified Patchwork Algorithm: A Novel Audio Watermarking Scheme", Department of Control and Instrumentation Engineering, 0-7695-1062-0/01, 2001 IEEE.

Digital Watermarks for Audio Signals, Boney, et al, Proceedings of EUSIPCO-96, Eighth European Signal Processing Conference, 1996, pt 3, p. 1697-1700 vol. 3.

"Robust and High-Quality Time-Domain Audio Watermarking Subject to Psychoacoustic Masking", Wen-Nung Lie, Proceedings—IEEE International Symposium on Circuits and Systems, vol. 2, 2001, p. 1145-1148.

"Robust and High-Quality Time-Domain Audio Watermarking Based on Low-Frequency Amplitude Modification", Wen-Nug Lie, et al, IEEE Transactions on Multimedia, vol. 8, No. 1, Feb. 2006, p. 46-59.

"A Robust Digital Audio Watermarking Technique", Changsheng Xu, et al, Fifth International Symposium on Signal Processing and its Applications, ISSSPA'99, Brisbane, Australia, Aug. 22-25, 1999.

Embedding Indexing Information in Audio Signal Using Watermarking Technique, R. Lancini, et al, 4th EURASIP-IEEE Region 8 International Symposium on Video-Image Processing and Multimedia Communications, Jun. 16-19, 2002, Zadar, Croatia. p. 257-261.

A Novel Self-Synchronization PPM Robust Audio Watermarking Algorithm, Nedelijko Cvejic, et al, 2004 IEEE 11th Digital Signal Processing and 2nd Signal Processing Education Workshop (IEEE Cat. No. 04EX838), 2004, p. 288-291.

"Robust Multi bit and High Quality Audio Watermarking using Pseudo-Random Sequences", Ergun Ercelebi, Computers and Electrical Engineering 31 (2005) 525-536; www.sciencedirect.com.

"A Robust Watermarking Technique for Digital Audio", Aedudodla, et al, Iranian Journal of Electrical and Computer Engineering, vol. 4, n1, Winter/Spring, 2005, p. 11-17.

* cited by examiner

SELECTING BIT POSITIONS FOR STORING A DIGITAL WATERMARK

TECHNICAL FIELD

The present invention relates to a method and a system for selecting bit positions for storing a digital watermark in digital data, and in particular selecting bit positions corresponding to a predetermined spread function.

BACKGROUND OF THE INVENTION

Because of the increased interest in protecting digital data from illegal copying, watermarking of data has, in recent years, become increasingly popular. Embedding a watermark into a digital data file involves selecting samples from the digital data file and recording in selected bits of these samples, data comprising copyright information. Arrangements can then be made so that any unauthorized access or copying of the original data file runs the risk of the extracted watermark exposing the lack of legal ownership of the file.

An official and reliable watermark has to be difficult to find and remove or override. In addition, the watermark should not affect substantially the quality of the original data file.

Copyright protection by way of watermarking has become especially popular in the music industry, where recently there has been a strong increase in illegal downloads and copying. For the process of watermarking audio files, however, an additional consideration is related to the fact that many such files, together with the embedded watermarks, are processed on mobile phones and other hand-held players. In order to minimize cost and extend battery life, such hand-held devices often have slow processors with limited computational capabilities.

Some of the methods developed for embedding watermarks use spread spectrum techniques in the frequency domain. These methods generally require the original audio data for watermark detection. These methods also are computationally intense, because of the complex transformations involved in the data processing. Accordingly, these methods are not suitable for processing watermarked files in hand-held devices.

Other techniques embed watermarks in the time domain. Many of these techniques use the least significant data bits of the respective data samples to store the watermark. One disadvantage of this approach is that the stored watermark can be erased without significantly eroding the audio quality, thus undermining the reliability of the protection.

Accordingly, it is desirable to develop a method for embedding a watermark in digital data that is tamper-resistant and relatively simple, so that the verification of the watermark would not require substantial computational capabilities.

SUMMARY OF THE INVENTION

According to a first aspect of the invention, there is provided a method for protecting digital audio data comprising a plurality of samples. The method comprises selecting bit positions for storing a digital watermark in the digital audio data in time domain, by choosing a spread function characterising the plurality of the selected bit positions, wherein the spread function comprises at least one Gaussian curve.

Preferably, the at least one Gaussian curve is defined by spread function parameters including;

- the point of time corresponding to the peak of the Gaussian curve,
- the standard deviation of the Gaussian curve;
- the time interval between samples selected for storing the watermark; and
- the bit position of the sample storing the watermark at the peak of the Gaussian curve.

According to a second aspect of the invention, there is provided a stand-alone or a networked computer system for selecting bit positions for storing a watermark in a digital audio signal, the signal comprising of plurality of samples in time domain. The computer system comprises computational means for spreading the digital watermark data in time domain by storing the data in bit positions of selected ones of the samples. The computational means are programmed to define a spread function characterising the plurality of the selected bit positions used for storing the watermark. The spread function comprises at least one Gaussian curve defined by spread parameters including;

- the point of time corresponding to the peak of the Gaussian curve;
- the standard deviation of the Gaussian curve;
- the time interval between samples selected for storing the watermark; and
- the bit position of the sample storing the watermark at the peak of the Gaussian curve.

According to a third aspect of the invention, there is provided a computer program product comprising a computer readable medium with a computer program recorded therein for selecting bit positions for storing a watermark in a digital audio data in time domain. The digital data comprises a plurality of samples. The computer program comprises means for spreading the digital watermark data by storing the data in bit positions of selected ones of the samples. The spread function characterising the plurality of the selected bit positions used for storing the watermark comprises at least one Gaussian curve defined by spread parameters including;

- the point of time corresponding to the peak of the Gaussian curve;
- the standard deviation of the Gaussian curve;
- the time interval between samples selected for storing the watermark; and
- the bit position of the sample storing the watermark at the peak of the Gaussian curve.

DETAILED DESCRIPTION

Method, system and computer program products for selecting bit positions for storing a digital watermark are described. In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The Spread Function

An important feature of any algorithm for embedding watermarks in the time domain, is the choice of bit positions of the samples in the audio file that are to be used for storing the watermark. If the bit positions that contain the watermark data are not sufficiently spread out, a process analogous to "signal jamming" can be used to erase the watermark. For example, using only the least significant bits in the respective audio file for storing the watermark is attractive, since the audio quality will not be perceptibly affected by the watermark. However, the predictability of such an approach exposes the protected audio signal to an "erasing" attack that, when directed to the least significant bits, will also affect the quality of the audio signal only marginally. However, the use of more significant bit positions of selected samples for the watermark will perceptibly degrade the audio quality of the original file.

The described method relies on choosing a weighted mix of bit positions for storing the watermark. In particular, the utilized bit positions follow a normal distribution and can be represented by a Gaussian, also known as "normal" or "bell", curve. As a result, out of the samples selected for use by the watermark, the number of samples using bit position i for storing the watermark is exponentially smaller than the number of samples using bit position (i−1). Such a ratio offers a good compromise between reliability and distortion introduced by the watermark.

Since linear Pulse Code Modulation (PCM) encoding, where the quantization levels are evenly paced, is the most common technique used for sampling music, it is assumed for the present process that the original data file is PCM encoded. However, this is not essential, and the discussed algorithm can be easily adapted for other time domain encoding techniques.

Figure 1:
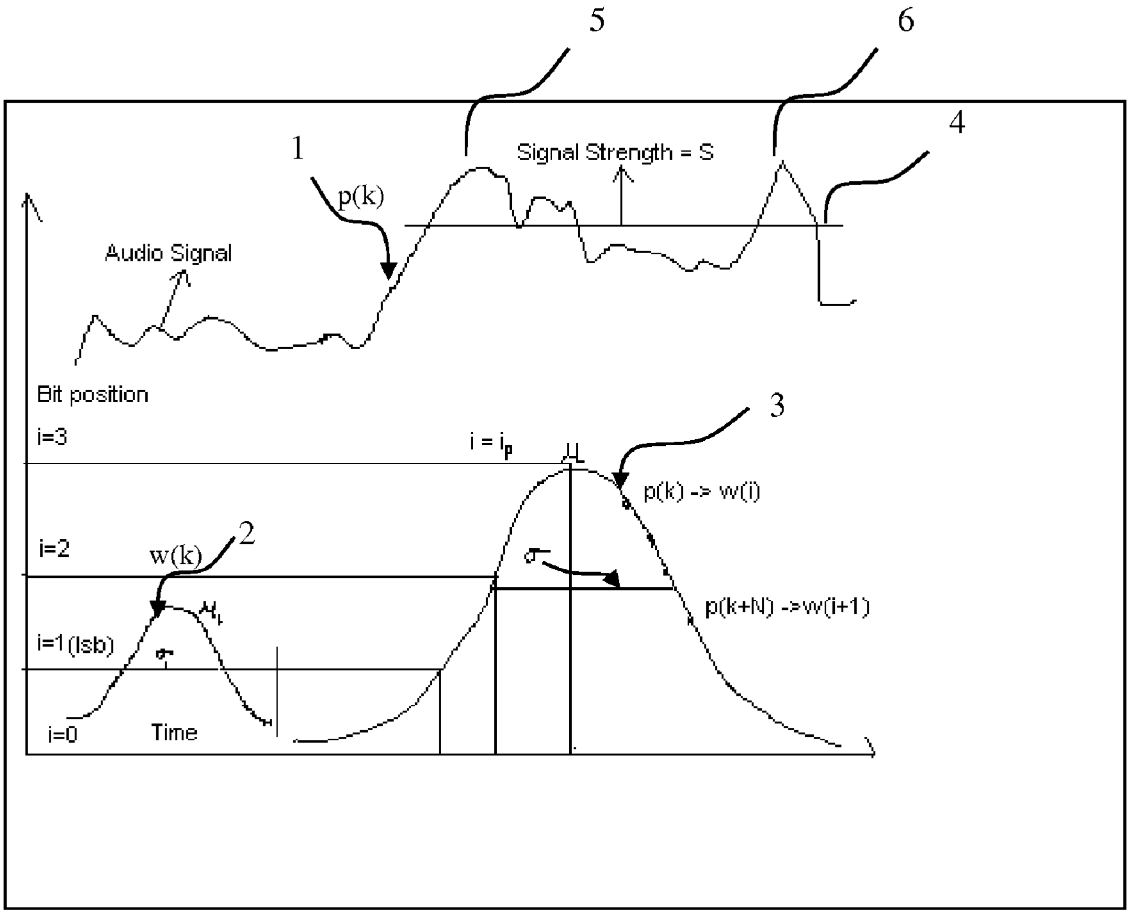
FIG. 1 is a schematic diagram of a spread function of one embodiment of the present invention applied to a digital audio signal.

FIG. 1 illustrates an audio signal 1 as a function of time. FIG. 1 also shows Gaussian curves 2 and 3, which are part of a spread function chosen for embedding a watermark in the audio signal 1. The function p(k) denotes the audio file samples, while the function w(k) denotes those of p(k) samples that are selected to hold the watermark. As shown in FIG. 1, and as indicated in step 202 of method 200 of FIG. 2, each Gaussian curve of the spread function is defined by using the following parameters:

- μ—The point in time when the Gaussian curve peaks.
- σ—The standard deviation of the Gaussian curve.
- N—The interval between audio samples. Only those sample points in the curve at intervals of N are selected to embed the watermark.
- $i_p$—The bit position of the samples used to store the watermark near the peak of the curve, i.e. the value of i at time μ.

Parameter μ is chosen to be at one of the points in time when some distortion would be tolerable to the auditory senses (e.g., when there is a loud or jarring piece of audio). However, to minimize the effect of the watermark itself on the quality of the audio sample, μ should be positioned at a point in time, when the PCM signal strength is smaller than a selected level 4, chosen to correspond to a signal strength S that is below the local peaks 5 and 6, as shown in FIG. 1. Thus, μ should have a value that is smaller than that of the local peaks within a region defined by a predetermined number of units in either direction from the point of interest. The predetermined number of units can either be a constant specific to the audio file, or fine-tuned by the creator of the audio file for each Gaussian curve that the audio signal carries. The Gaussian curve should avoid regions of low amplitude since distortions in these regions are more discernible to the auditory senses.

The sample interval N is chosen depending on the length of the desired watermark that is to be embedded and the frequency of embedding that is desired. A typical value can be calculated using the formula:

$$N=(\text{Sampling frequency} \times \text{bits per sample} \times x)/y \qquad (1)$$

where in Eq. (1) the parameters x and y refer to every 'x' seconds of audio being protected by a watermark of length 'y'. For example, if it is assumed that every 30 seconds of CD quality audio (44.1 KHz, 16 bits per sample) needs to be protected by a 40 byte watermark, then N=(44100*16*30)/40=529200, i.e., one in every 529200 bytes in the audio needs to be selected for holding the watermark.

The parameters σ and $i_p$ are chosen on the basis of an engineering compromise between the expected probability for watermark removal attack, and the tolerance to distortions introduced by the watermark. The value chosen for $i_p$ also depends on the bits per sample ratio, or the granularity of quantization, characterizing the digital audio sample that is to be protected. An audio recording with higher bits per sample ratio can tolerate a higher $i_p$. For a given i (say i=2), the larger the value of σ, the larger will be the number of selected samples using the second least significant bit for storing the watermark.

The effect of different spread curve combinations can be experimentally determined with the help of a visual drag-and-adjust application program interface (API) that allows variations of σ, μ, N and $i_p$.

Multiple Gaussian curves also can be used across the same audio file to better control the above compromise between security and distortion. For instance, FIG. 1 shows two Gaussian curves 1 and 2, defining the distribution of the watermarked audio data. Any intersecting region between adjacent curves 1 and 2 is ignored.

Figure 2:
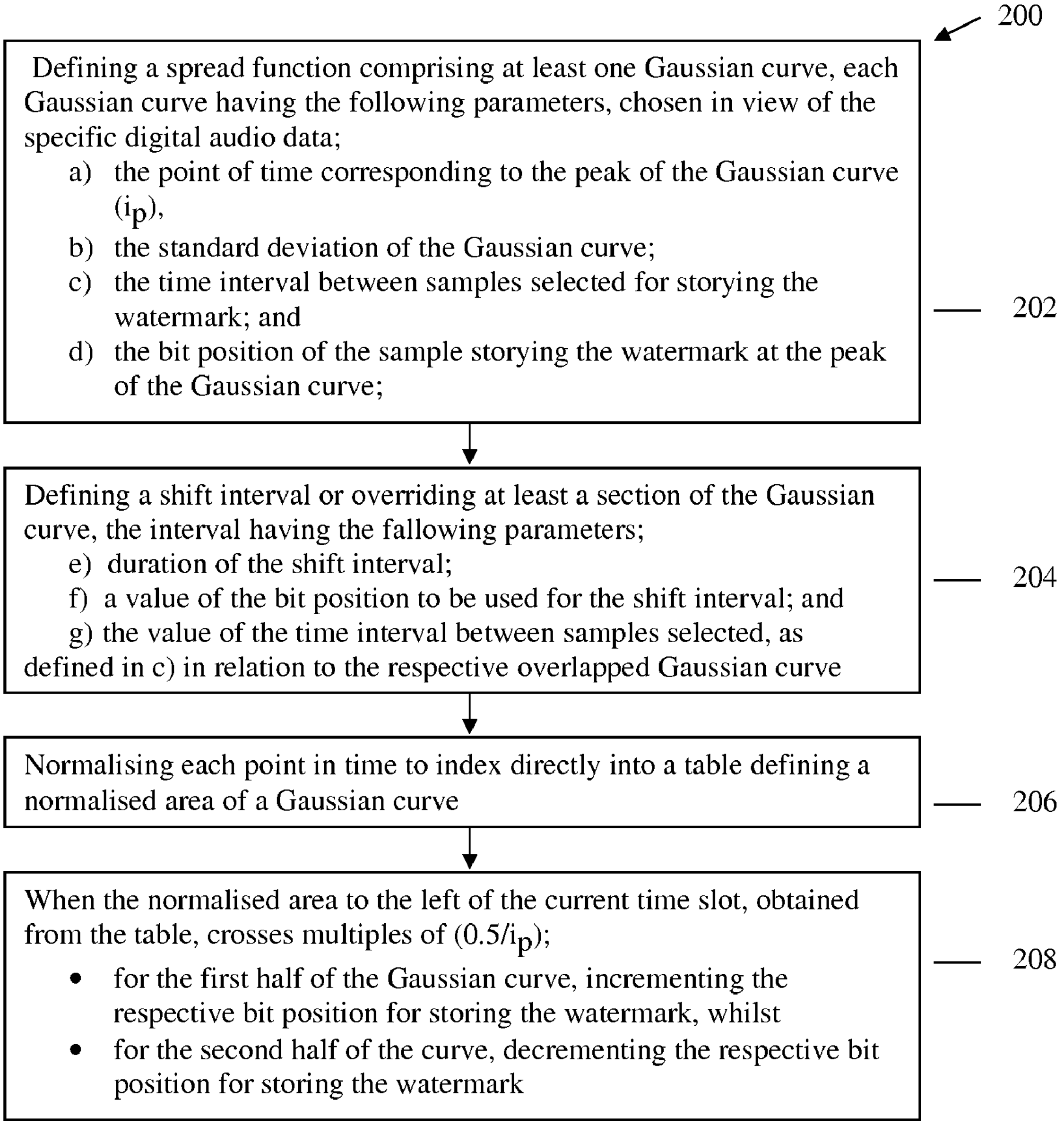
FIG. 2 is a schematic flow diagram of a process of selecting the bit positions for storing the water mark, embodying the invention.

Additional control over the spread function can be obtained by introducing the functionality of "shift intervals", as indicated in step 204 in FIG. 2. Shift intervals are used in cases where trade offs between contrasting requirements is complex and a single combination of Gaussian curves can not provide a satisfactory solution. In this case, a shift interval is superimposed over an area of a Gaussian curves, where bit positions need adjustment. For each sample point within this area, the bit positions defined by the Gaussian curve are overridden by a particular bit position defined for the shift interval.

A shift interval is defined by the parameters (t1, t2, v, p), where t1, t2 are the starting and the finishing points in time, v is the value of i during the time interval t1 to t2, and p is the value of N (period) during that interval. The respective bit positions of points in any Gaussian curve that exists between t1 and t2 are overridden with v. The case when v=p=0 results in a blanking interval. Samples falling within such a blanking interval are exempt from carrying watermarking information. This can be used in critical audio regions, where even an occasional degradation is unacceptable.

The Spread Function Key

The entire information associated with parameters of the Gaussian curves and the shift parameters included in the spread function can be summarized in a "Spread Key" recorded in a look-up table.

For example, a Spread Key can be represented as G+S in the equations below where $$G=(\{(\mu[1], \sigma[1], N[1], i_p[1], t1[1], t2[1]) \ldots (\mu[k], \sigma[k], N[k], i_p[k], t1[k], t2[k]))\} \quad (2)$$

and $$S=\{(t1[1], t2[1], v[1], p[1]) \ldots (t1[m], t2[m], v[m], p[m]\}) \quad (3)$$

In Eq (2) G is the set of Gaussian curves and in Eq (3) S is the set of shift intervals within the audio data. The simplest spread function includes only one Gaussian curve and no shift intervals. The spread key in this case is given by Eq (4).

$$\text{Spread Key}=(\mu, \sigma, N, i_p) \quad (4)$$

The additional data necessary for computing the bit position of the selected samples that are to be used for storing watermark information is the normalized area under the Gaussian curve. This data can be found in tabulated form in standard text books on statistics and probability. The embedding software stores the tabulated data in memory.

The Watermark Embedding Algorithm

The algorithm to embed the watermark is as follows:

```
Choose the spread function parameters (mew, sigma, i_p) valid for this
sample set, and store them in a lookup table for later use by the
decoder.
bit__position__to__embed = 0;
 for t = 0 to end__of__sample do {
  /* Normalize 't' so that it can index directly into the Gaussian area,
     table see step 206 in Fig 2 */
   normalized__t = (t−μ)/σ,
   area__under__curve = guassian__area__table[normalised__t];
   /* Every 'x' seconds of audio needs to be protected by a watermark
      of length 'y' */
   N = (Sampling__frequency * bits__per__sample * x)/y
   /* 0.5 is the area under each half of the normalized Gaussian curve */
   if (((area__under__curve) mod (0.5/i_p)) == 0) {
      if (normalised__t < 0) bit__position__to__embed++;
      else bit__position__to__embed−−;
   }
   if ( the PCM sample at t does not belong to the set of samples with
   period N) {
      Do not embed
   } else if (t belongs to a shift interval) {
      Embed the encrypted watermark using bit positions specified in the
      shift interval.
   } else {
      Embed encrypted watermark at bit__position__to__embed of this
      sample;
   }
}
```

Figure 3:
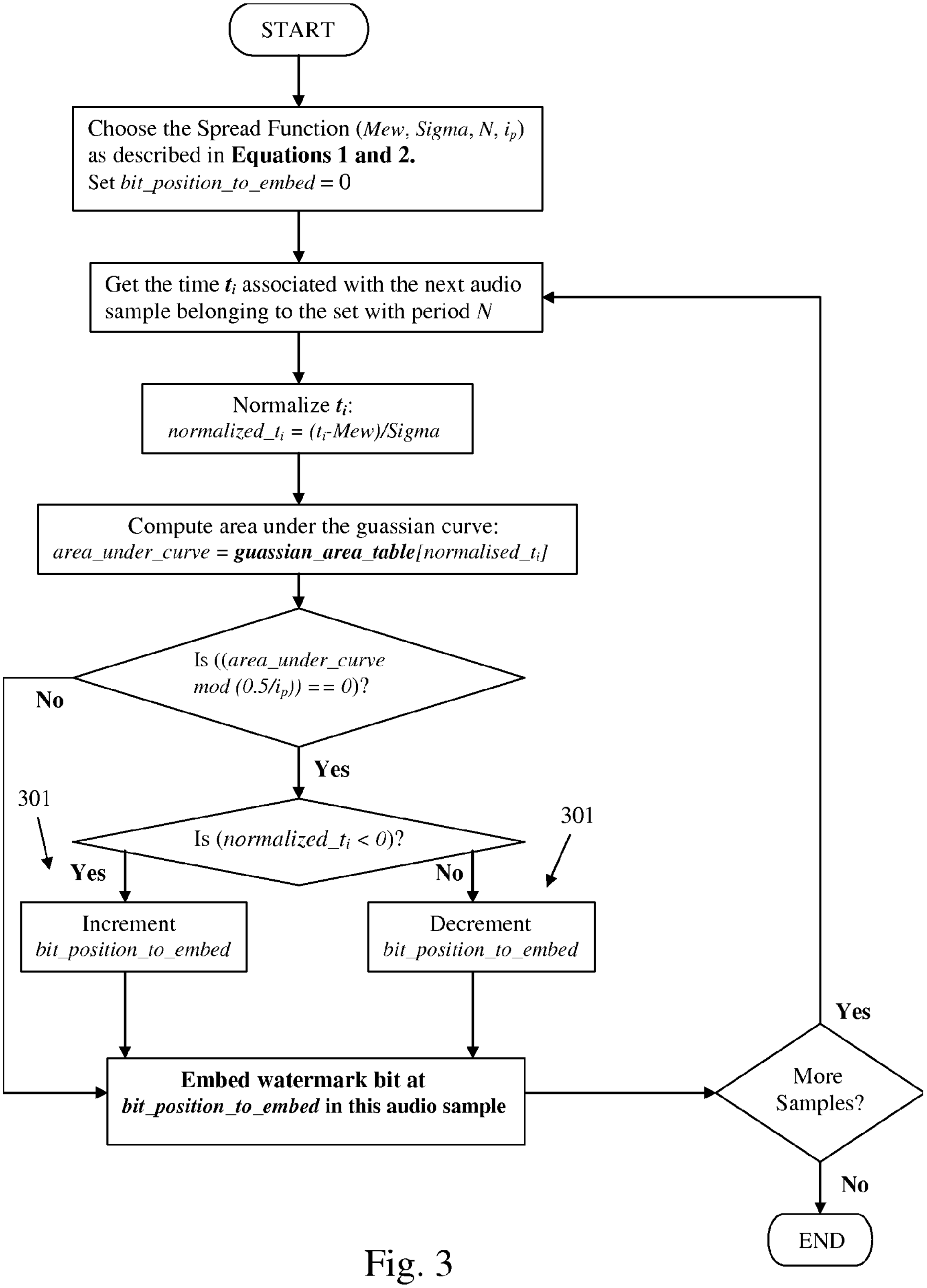
FIG. 3 is a detailed process diagram of the process of selecting the bit positions for storing the water mark shown in FIG. 2.

The above pseudo code is illustrated with the functional description in FIG. 2 and the schematic diagram representation of FIG. 3. As indicated in step 208 in FIG. 2 and path 301 of FIG. 3, for the first half of each curve 1 or 2 the bit position used to store the watermark is incremented whenever the area to the left of the current time slot t, normalized to $(t-\mu)/\sigma$ (that is obtained from the stored standardized table defining a normalized area of a Gaussian curve) crosses multiples of $(0.5/i_p)$. For the second half of the respective curve 1 or 2, shown with path 302 of FIG. 3, at each crossing point, the bit position used to store the watermark is decremented instead. This process is chosen to ensure that the number of samples in which bit position i is used to store the watermark, is exponentially smaller than the number of samples in which bit position (i−1) is used to store the watermark. To achieve this, the area under the curve for each bit position, which is $0.5/i_p$, needs to remain the same. The numerator 0.5 is the area under each half of a normalized Gaussian curve (total area is 1), whilst $i_p$ is the largest bit position that carries watermarked data. The area under the curve is distributed uniformly across bit positions used to store the watermark, even though the number of samples where the same bit position is used for watermark storage is distributed exponentially.

An encryption algorithm can be used in conjunction with the spread algorithm described previously. One example of such algorithm is the widely used "RC4" (also known as "ARC4" or "ARCFOUR") stream cipher algorithm that produces dissimilar cipher text for each instance of the watermark. The resulting cipher stream is embedded at the bit positions of chosen samples, as calculated by the spread algorithm described previously.

If a respective Gaussian curve is valid only during a time interval t1 to t2, the steps outlined in the above watermark embedding algorithm are applied only during that interval. The spread parameters can either be generated automatically by software (by following heuristics and/or with the help of a random number generator), through user input using a custom drop-and-adjust program interface or by a combination of both. The encoder uses the bit positions of the samples generated above, for storing the encrypted watermark. Encryption can be accomplished by any encoding algorithm. After embedding the watermark, the spread keys, the encryption keys and the watermark itself, are stored in a lookup table to be used later for decoding.

A measure of the relative amount of audio degradation introduced into the protected audio file by the watermark during any time interval can be determined with the use of a standardized table defining a normalized area of a Gaussian curve, by finding the area under the curve during those time intervals.

The proposed method for introducing a spread in the number of bits used for embedding a watermark gives good control over watermark positioning with only limited amount of retrieval information necessary to be stored. To allow verification of the watermark by an authorized party, the decoder of the verifying party needs to access the lookup table including the spread keys, the encryption keys and the watermark. During decoding, the corresponding spread function parameters are obtained from the lookup table and the spread function is reconstructed. Watermark bits from the identified bit positions are continuously extracted and fed into the stream decipher along with the decryption key that is also obtained from the lookup table. The watermark information is extracted from the audio file and compared with the watermark information stored for this audio work in the lookup table, to effect verification of the authenticity of the watermark.

The watermark embedding or extraction can be accomplished in a single pass of the audio data through an audio data processing system that decodes the coded data and verifies the watermark. Of course, if the spread function is present only over part of the audio data, only that part of the audio data needs to be processed. The described method for identifying the bits for embedding the watermark allows the watermark encoding or decoding at high speeds using simple mathematical operations. Notably, the method described herein makes it difficult for malicious attacks to successfully erase or replace the watermark.

Computer Platform

Figure 4:
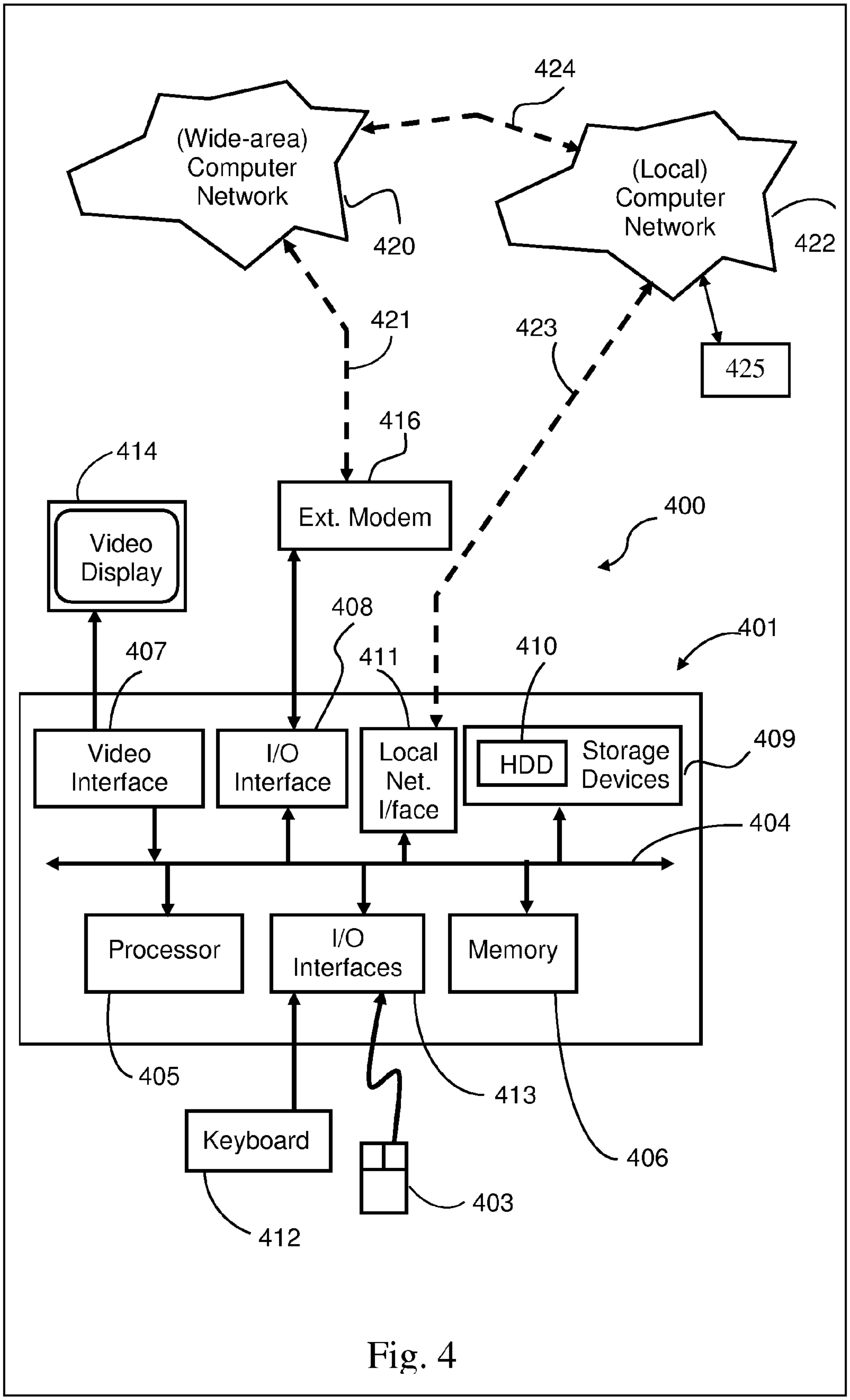
FIG. 4 is a schematic diagram of a computer system for implementing embodiments of the invention.

FIG. 4 shows a schematic block diagram of a network system 400 with which the method for selecting the bits for embedding watermarks, as described above with respect to FIGS. 1 to 3, can be implemented in the form of application programs executable within a general purpose computer system 401 or within a hand-held device 425. The software implementing the method described with the pseudo code in the "The Watermark Embedding Algorithm" section, and any other associated software, may be stored in a computer readable medium including storage devices. In the case illustrated in FIG. 4, the software is loaded into the computer 401 from the computer readable medium 410 and then executed by the computer 401. A computer readable medium having such software or computer program recorded on it is a computer program product.

As seen in FIG. 4, the computer system 401 can include input devices such as a keyboard 402 and a mouse pointer device 403, and output device such as display device 414. In this configuration, the computer 401 can be connected to any other computer systems via a network as data conversion is a means usually utilized when the watermark or the spread key data needs to be used by multiple computer systems, communicating with each other over a network. An external Modulator-Demodulator (Modem) transceiver device 416 may be coupled to the computer 401 for communicating to and from a communications network 420 via a connection 421. The network 420 may be a wide-area network (WAN), such as the Internet, or a private LAN.

The computer 401 typically includes at least one processor unit 405, and a memory unit 406 for example formed from semiconductor random access memory (RAM) and read only memory (ROM). Here, the processor unit 405 is an example of a processing means which can also be realized with other forms of configuration performing similar functionality. The computer 401 also includes an number of input/output (I/O) interfaces including a video interface 407 that couples to the video display 414, an I/O interface 413 for such devices like the keyboard 402 and mouse 403, and an interface 408 for the external modem 416. In some implementations, the modem 416 may be incorporated within the computer 401, for example within the interface 408. The computer 401 may also have a local network interface 411 which, via a connection 423, permits coupling of the computer 401 to a local computer network 422, known as a Local Area Network (LAN). As also illustrated, the local network 422 may also couple to the wide network 420 via a connection 424, which would typically include a so-called "firewall" device or similar functionality. The interface 411 may be formed by an Ethernet™ circuit card, a wireless Bluetooth™, an IEEE 802.11 wireless arrangement or a combination of thereof.

Storage devices 409 are provided and typically include a hard disk drive (HDD) 410. It should be apparent to a person skilled in the art that other devices such as a floppy disk drive, an optical disk drive and a magnetic tape drive (not illustrated) may also be used. The components 405 to 413 of the computer 401 typically communicate via an interconnected bus 404 and in a manner which results in a conventional mode of operation of the computer 401.

Typically, the programming modules that incorporate the method for choosing the bit positions for watermarking are resident on the storage device 409 and read and controlled in execution by the processor 405. Storage of intermediate product from the execution of such programs may be accomplished using the semiconductor memory 406, possibly in concert with the storage device 409. In some instances, the application programs may be supplied to the user encoded on one or more CD-ROM or other forms of computer readable media and read via the corresponding drive, or alternatively may be read by the user from the networks 420 or 422.

If verification is required on the handheld device 425, it can either utilize its own storage and processing means, similar to these described in relation to computer 401, or make use of a wireless network connection to a computer system, such as 401, on which all watermark related processing can be carried out remotely.

While the invention has been hereby described by using an example that is believed to represent the most practical and preferred embodiment, it would be clear to a skilled addressee that other embodiments and variations will also be within the scope of the main concept of the invention. For example, the method for selecting the bit positions of the samples used for storing a watermark has been descried here in the context of an audio file that is linearly PCM encoded. However, the method is applicable for other encoding techniques, as well as to video and other types of digital data in the time domain.

The discussed method for selecting the bit positions of the samples used for storing a watermark, allows spreading the watermark in the time domain using Gaussian curves. This offers a compact spread information representation. The data processing involved is relatively simple with modest demands on the computational power of the processing device. This facilitates identifying the location of a watermark in real-time even in a low-MIPS (Millions of Instructions per Second) devices, such as mobile phones and other handheld media players.

Other advantages of the discussed method include the following;

a) the watermark is spread over the data in such a manner that, 'guess' deletions of the watermark significantly erode the quality of the watermarked audio file;

b) the spread function can be compactly represented in the form of a spread key. Even if the spread algorithm is known, security of the watermarked audio file is ensured by the key;

c) the original signal data is not needed for watermark verification;

d) the author of the audio work can adjust the algorithm operation to exploit his/her knowledge of the work that is getting watermarked;

e) Streaming audio can be watermarked on-the-fly and search crawlers can run the detection algorithm while displaying results also on-the-fly.

I claim:

1. A method for protecting a digital audio data stream representing an audio signal, the digital audio data stream comprising a plurality of samples, each sample corresponding to a respective time and representing, as a digital data value comprising a plurality of bits in pre-defined bit positions, an amplitude of the audio signal at the corresponding respective time, the method comprising:

selecting, for each sample of a subset of said plurality of samples, a single respective bit position within the sample for storing a corresponding bit of a digital watermark in the digital audio data stream in time domain, by choosing a spread function characterising the plurality of the selected bit positions, wherein the spread function comprises at least one Gaussian curve, the at least one Gaussian curve being defined by spread function parameters including:

a) a point of time corresponding to a peak of the Gaussian curve, b) a standard deviation of the Gaussian curve;

c) a time interval between samples selected for storing the watermark; and d) the bit position of the sample storing the watermark at the peak of the Gaussian curve; and performing one of: (I) embedding said digital watermark in the digital audio data stream by storing each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain; and (II) extracting said digital watermark from the digital audio data stream by extracting each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain.

2. The method of claim 1, wherein the spread function comprises a plurality of Gaussian curves, each characterized by respective parameters a) to d).

3. The method of claim 1, the spread function further comprising a shift interval, the shift interval having a pre-determined bit position and being arranged to at least partially overlap a pre-defined Gaussian curve of the spread function, wherein data bit positions in the overlap area are overridden by the pre-determined bit position, to effect storing the watermark in the overlap area in the pre-determined bit position specified for the shift interval.

4. The method of claim 3, wherein the shift interval is defined by;

e) duration of the shift interval, including the starting and the final point of time;

f) a value of the bit position that is to be used during the shift interval; and g) the value of the time interval between samples selected, as defined in c) in relation to the respective overlapped Gaussian curve.

5. The method of claim 4, wherein both the value of the bit position, from f), and the time interval, from g), are equal to zero, to effect exempting the digital audio data stream within the shift interval from carrying watermark data.

6. The method of claim 4, wherein the spread function is represented by a spread key including parameters defined in a) to g), the spread key being made available for verifying the watermark data.

7. The method of claim 1, wherein the spread function parameters a) to d) are at least partially generated automatically.

8. The method of claim 1, wherein the spread function parameters a) to d) are at least partially user defined.

9. The method of claim 6, wherein the method comprises:

A) for each of the plurality of points in time covered by the spread function, choosing the spread function parameters a) to d), that are valid for the respective time intervals in which the respective point in time falls, and storing the spread function parameters in a spread function key;

B) normalising each point in time to index directly into a standardised table defining a normalised area of a Gaussian curve; and C) when the normalised area to the left of a current time slot, obtained from the table, crosses multiples of one half of the inverse value of the largest bit position that carries watermarked data, performing;

i) for a first half of the Gaussian curve, incrementing the respective bit position for storing the watermark, whilst ii) for a second half of the curve, decrementing the respective bit position for storing the watermark.

10. The method of claim 9, the method further comprising;

D) for each points in time for which a shift interval is applicable, storing the watermark data in the bit position specified in the shift interval; and E) for each remaining points in time, storing the watermark data in the bit positions calculated in claim 9.

11. The method of claim 9, wherein an encryption algorithm, having an encryption key, is applied to the watermark, the encryption key, the spread function key and the watermark itself being stored for use during decoding and copyright verification.

12. A computer program product, comprising:

a non-transitory computer readable medium having a computer program recorded therein for protecting a digital audio data stream representing an audio signal, the digital audio data stream comprising a plurality of samples, each sample corresponding to a respective time and representing, as a digital data value comprising a plurality of bits in pre-defined bit positions, an amplitude of the audio signal at the corresponding respective time, wherein the computer program, when executed by at least one digital data processing device, performs the method comprising:

selecting, for each sample of a subset of said plurality of samples, a single respective bit position within the sample for storing a corresponding bit of a digital watermark in the digital audio data stream in time domain, by choosing a spread function characterising the plurality of the selected bit positions, wherein the spread function comprises at least one Gaussian curve, the at least one Gaussian curve being defined by spread function parameters including;

a) a point of time corresponding to a peak of the Gaussian curve, b) a standard deviation of the Gaussian curve;

c) a time interval between samples selected for storing the watermark; and d) the bit position of the sample storing the watermark at the peak of the Gaussian curve; and performing one of: (I) embedding said digital watermark in the digital audio data stream by storing each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain; and (II) extracting said digital watermark from the digital audio data stream by extracting each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain.

13. A stand-alone or networked computer system for protecting a digital audio data stream comprising a plurality of samples, each sample corresponding to a respective time and representing, as a digital data value comprising a plurality of bits in pre-defined bit positions, an amplitude of the audio signal at the corresponding respective time, the computer system comprising:

a memory;

at least one processor executing instructions storable in the memory;

a first function executable on the at least one processor which selects, for each sample of a subset of said plurality of samples, a single respective bit position within the sample for storing a corresponding bit of a digital watermark in the digital audio data stream in time domain, by choosing a spread function characterising the plurality of the selected bit positions, wherein the spread function comprises at least one Gaussian curve, the at least one Gaussian curve being defined by spread function parameters including:

a) a point of time corresponding to a peak of the Gaussian curve, b) a standard deviation of the Gaussian curve;

c) a time interval between samples selected for storing the watermark; and d) the bit position of the sample storing the watermark at the peak of the Gaussian curve; and a second function executable on the at least one processor which performs one of: (I) embedding said digital watermark in the digital audio data stream by storing each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain; and (II) extracting said digital watermark from the digital audio data stream by extracting each respective bit of digital watermark data at the respective bit position within the corresponding sample of the digital audio data stream selected by said selecting, for each sample of a subset of said plurality of samples, a single respective bit position within the sample for storing a corresponding bit of a digital watermark in the digital audio data stream in time domain.

* * * * *